(12) United States Patent
Gao et al.

(10) Patent No.: US 6,810,174 B2
(45) Date of Patent: Oct. 26, 2004

(54) OPTICAL FILTER AND OPTICAL FILTERING METHOD

(75) Inventors: Zhan Gao, München (DE); Reinhold Noé, Paderborn (DE)

(73) Assignee: Infineon Technologies AG, Munich (DE)

( * ) Notice: Subject to any disclaimer, the term of this patent is extended or adjusted under 35 U.S.C. 154(b) by 88 days.

(21) Appl. No.: 10/244,806

(22) Filed: Sep. 16, 2002

(65) Prior Publication Data

US 2003/0081894 A1 May 1, 2003

(30) Foreign Application Priority Data

Sep. 14, 2001 (DE) .......................................... 101 47 227

(51) Int. Cl.[7] .............................. G02B 6/42; H04B 10/06
(52) U.S. Cl. .......................................... 385/27; 398/212
(58) Field of Search .............................. 385/24, 27, 28, 385/12, 42, 45, 46, 39; 398/212, 161; 359/308, 337.2

(56) References Cited

U.S. PATENT DOCUMENTS

| | | | |
|---|---|---|---|
| 5,259,048 A | | 11/1993 | Ozeki |
| 5,930,414 A | * | 7/1999 | Fishman et al. ............... 385/11 |
| 6,330,375 B1 | * | 12/2001 | Fishman et al. ............... 385/11 |
| 6,339,489 B1 | * | 1/2002 | Bruyere et al. ............. 398/147 |
| 6,603,890 B2 | * | 8/2003 | Khosravani et al. .......... 385/11 |

OTHER PUBLICATIONS

Noé R. et al.: "Polarisation Mode Dispersion Compensation At 20 Gbit/S With Fibre–Based Distributed Equaliser", IEE, Electronics Letters No. 25, vol. 34, Dec. 10, 1998, pp. 2421–2422.

* cited by examiner

Primary Examiner—Ashok Patel
Assistant Examiner—Peter Macchiarolo
(74) Attorney, Agent, or Firm—Laurence A. Greenberg; Werner H. Stemer; Ralph E. Locher (57) ABSTRACT

An optical signal alternately traverses a total of n couplers and n−1 DGD units, arranged therebetween, with a differential group delay between two signal modes. The power division between the two signal modes is measured in each DGD unit in a power division controller, and a signal that is proportional to the difference between the powers in the two signal modes is obtained. The signal is led to an integrating controller whose control signal is led to a differential phase shifter that is accommodated in the DGD unit present upstream in the beam path. The difference between the powers of the two signal modes is thereby brought to zero at least approximately. This has the consequence that it is essentially only the chromatic dispersion that is generated or equalized, but no other disturbing distortions of the optical signal are produced.

17 Claims, 4 Drawing Sheets

OPTICAL FILTER AND OPTICAL FILTERING METHOD

BACKGROUND OF THE INVENTION

Field of the Invention

The invention relates to an optical filter and an associated method for optical filtering. An optical signal traverses n coupling elements and n-i units with a differential group delay alternately in a conductor structure. The optical signal can be divided between a first coupling element and an $n^{th}$ coupling element into a first and a second signal mode.

Chromatic dispersion impairs high-rate optical data transmission. A chromatic dispersion compensator is described in U.S. Pat. No. 5,259,048. The device is an optical filter that can equalize or generate chromatic dispersion. It is constructed from cascaded Mach-Zehnder interferometers. The is also possible to make use, instead of the customary design with two waveguides, of the two modes, termed signal modes below, of a single waveguide. It is disadvantageous in that case that the adjustment of a relatively large number of propagation time differences is required. This can be accomplished in practice only with difficulty. In particular, it would be necessary for the signal whose dispersion is compensated to be precisely analyzed, and this would cause a high outlay.

Electronics Letters 34(1998)25, pages 2421–2422, specifies a similar optical filter for compensating polarization mode dispersion, one of the differences from U.S. Pat. No. 5,259,048 consisting in that the input signal can already be arbitrarily divided into the two signal modes of the, here single, waveguide, and that the output signal can comprise both signal modes of the single waveguide, and also does so as a rule. Here, as well, the adjustment of the many adjustable voltages is a difficult task requiring at least a great deal of time to accomplish.

SUMMARY OF THE INVENTION

It is accordingly an object of the invention to provide an optical filter and an optical filtering method which overcome the above-mentioned disadvantages of the heretofore-known devices and methods of this general type and which specify simple and effective possibilities for adjusting an optical filter, in particular a chromatic dispersion compensator.

With the foregoing and other objects in view there is provided, in accordance with the invention, an optical filter for an optical signal, comprising:

a number n coupling elements and n-1 units with a differential group delay disposed in a conductor structure to be alternately traversed by the optical signal, wherein the optical signal can be divided between a first the coupling element and an nth the coupling element into a first signal mode and a second signal mode;

a measuring device disposed in a beam path of the optical signal, the measuring device outputting a power division signal characterizing a division of a power of the optical signal into a first measurement mode and a second measurement mode;

a control element disposed in the beam path of the optical signal upstream of the measuring device, the control element influencing the division of the power of the optical signal into the first and second measurement modes, and the control element having a control input connected to receive a control signal obtained from the power division signal such that a prescribed division of the power of the optical signal into the first and second measurement modes results.

In other words, the inventive solution to the above problems consists in that the power division between two signal modes, for example signal modes in interferometer arms, is monitored within the optical filter, and is shaped at least approximately, by setting a control element, for example a further interferometer, upstream thereof in the propagation direction, with a controllable phase difference, such that the desired filter properties, for example chromatic dispersion, occur. For first-order chromatic dispersion, equal optical powers are set in the two signal modes or interferometer arms, while for second-order chromatic dispersion the power division between the signal modes or interferometer arms is varied periodically along the optical filter.

The division of the powers into the two signal modes can be selected respectively according to a desired characteristic of the optical filter in order to generate or compensate polarization mode dispersion.

In accordance with an added feature of the invention, the control element is a controllable differential phase shifter, and one of the coupling elements, providing the first and second measurement mode, is connected between the differential phase shifter and the measuring device.

In accordance with an additional feature of the invention, the control element is formed by one of the coupling elements configured to be controllable.

Preferably, the first and second measurement modes are first and second signal modes.

In accordance with another feature of the invention, the coupling element has first and second measurement mode outputs carrying the first and second measurement modes, and an output mode output, between the first and second measurement mode outputs, carrying an output mode of the optical signal.

In accordance with a further feature of the invention, the measuring unit includes devices for forming the power division signal proportionally to a linear combination of the powers of the first and second measurement modes. In a preferred embodiment of the invention, the devices form the power division signal proportionally to a difference between the powers of the first and second measurement modes.

In accordance with again an added feature of the invention, one of the coupling units has a coupling control input connected to receive a dispersion compensation signal for controlling a coupler phase angle thereof.

With the above and other objects in view there is also provided, in accordance with the invention, a method for optical filtering, which comprises:

traversing with an optical signal n coupling elements and n–1 units having a differential group delay alternately in a conductor structure, and dividing the optical signal between a first coupling element and an $n^{th}$ coupling element into a first signal mode and a second signal mode;

generating a power division signal characterizing a division of a power of the optical signal into a first and second measurement mode;

generating a control signal for controlling a control element influencing the division of the power of the optical signal into the first and second measurement modes, and thereby generating the control signal from the power division signal such that a prescribed division of the power of the optical signal into the first and second measurement modes results.

In accordance with again an additional feature of the invention, a differential phase shift is generated in the control element, and the first and second measurement modes are provided by a coupling element between the control element and the measuring device.

In accordance with again another feature of the invention, the first and second measurement modes are respectively output at a first and second measurement mode output of the coupling element, and an output mode of the optical signal is provided at an output mode output between the first and second measurement mode outputs.

In accordance with yet a further feature of the invention, the power division signal is formed proportionally to a linear combination of the powers of the measurement modes. Preferably, as mentioned above, the linear combination is a difference between the powers of the measurement modes.

In accordance with a concomitant feature of the invention, a dispersion compensation signal for controlling a coupler phase angle is fed to the coupling element.

Other features which are considered as characteristic for the invention are set forth in the appended claims.

Although the invention is illustrated and described herein as embodied in an optical filter and method for optical filtering, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
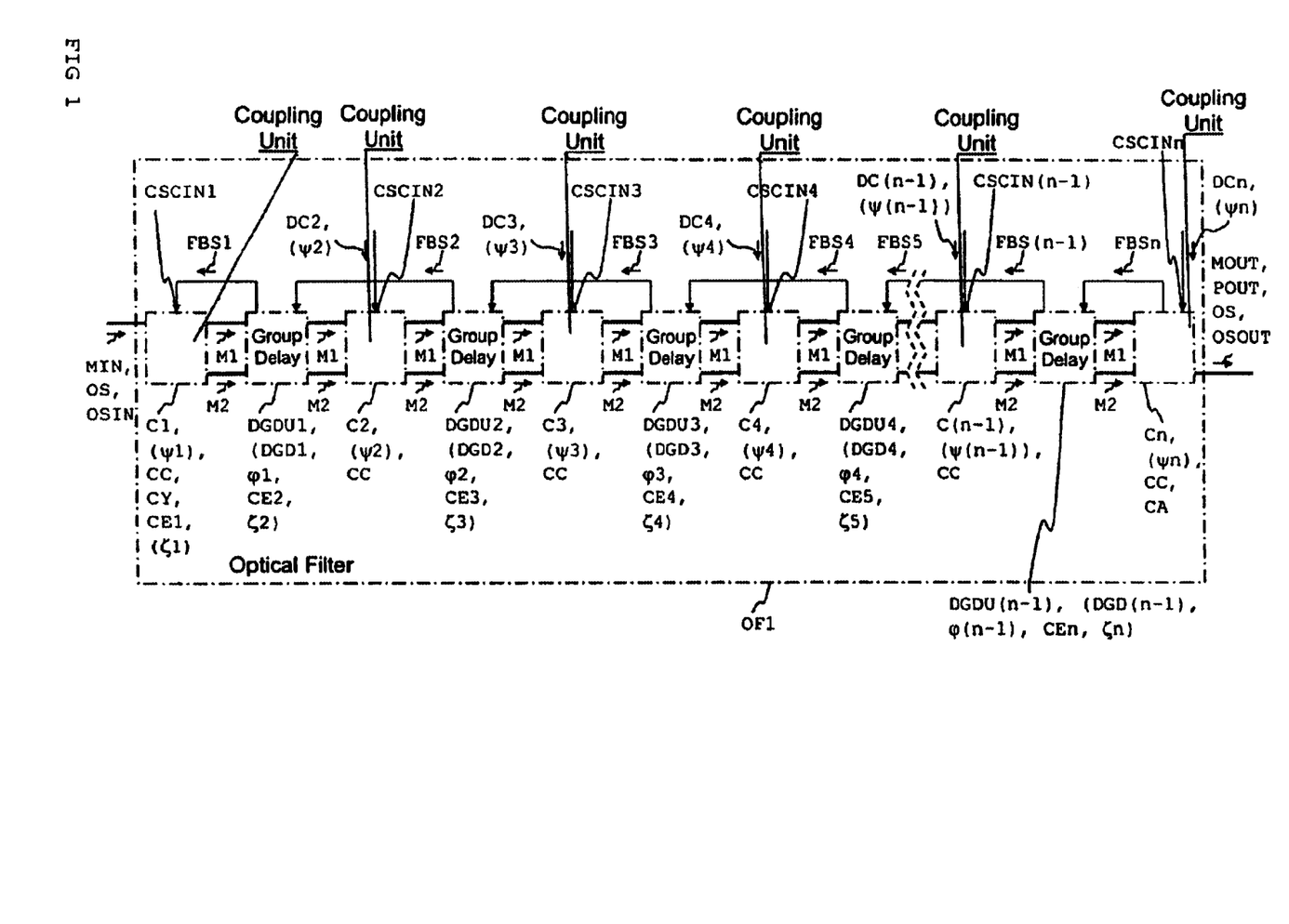
FIG. 1 is a diagrammatic view of an optical filter according to the invention.

Referring now to the figures of the drawing in detail and first, particularly, to FIG. 1 thereof, there is shown a first inventive optical filter OF1. An optical signal OS traverses a first to $n^{th}$ coupling unit Ci and first to $(n-1)^{th}$ unit with a differential group delay, termed DGD unit DGDUk below, that has a first to $(n-1)^{th}$ differential group delay DGDk. In this case, n is a positive integer that has, for example, at least the value of 2, i is a first ordinal number with i=1,2, ... ,n, and k is a second ordinal number (index) with k=1,2, ... , n−1. In this case, the $k^{th}$ DGD unit DGDUk follows the $k^{th}$ coupling unit Ck and the $(k+1)^{th}$ coupling unit Ck+1 follows the $k^{th}$ DGD unit DGDUk. It is possible at least between the output of the first coupling unit C1 and input of the $n^{th}$ coupling unit Cn for the optical signal OS to propagate in a first and a second signal mode M1, M2, between which the first to $(n-1)^{th}$ differential group delay DGDk occurs. There is no need, however, depending on the power division, for first and second signal mode M1, M2 always to have in each exemplary embodiment powers differing from zero at each location of the first optical filter OF1. The optical signal is preferably fed in in an input mode MIN as optical input signal OSIN at the input of the first coupling unit C1, and it is preferably extracted in an output mode MOUT as optical output signal OSOUT at the output of the $n^{th}$ coupling unit Cn. The first to $n^{th}$ coupling units C1 ... Cn preferably have a first to $n^{th}$ coupling control input CSCIN1 ... CSCINn.

It is known that conventional optical waveguides are actually bimodal even if they are designated as monomodal, because they conduct two orthogonal polarization modes. First and second signal modes M1, M2 can therefore be orthogonal polarization modes of a single waveguide. The first coupling unit C1 and the $n^{th}$ coupling unit Cn then determine the polarization, required on the input side and output on the output side, of the optical input signal OSIN or optical output signal OSOUT. These polarizations are precisely the input mode MIN and output mode MOUT. Although it is possible in this way to generate or compensate chromatic dispersion, this exemplary embodiment of the invention is particularly advantageous for the generation or compensation of polarization mode dispersion in particular.

The first and second signal modes M1, M2 can, however, also each be conducted in one waveguide alone. This has an advantage in the use of the optical filter for generating or compensating chromatic dispersion and, to be precise, it becomes independent of polarization, at least when these waveguides are not birefringent.

Figure 2:
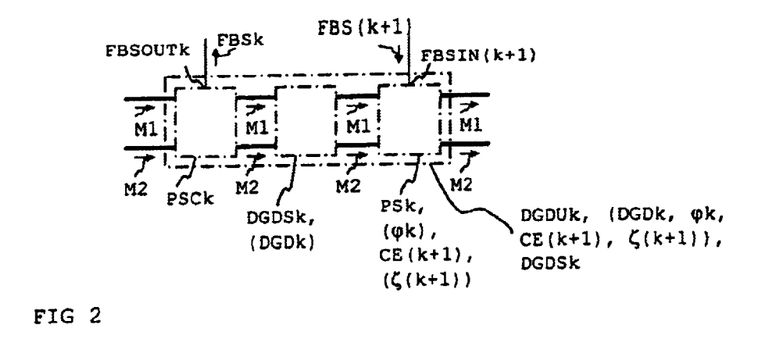
FIG. 2 is a diagrammatic view of a DGD unit.

FIG. 2 shows the design of the $k^{th}$ DGD unit DGDUk, wherein first and second signal modes M1, M2 of the optical signal OS are processed. These signal modes M1, M2 traverse in arbitrary sequence a $k^{th}$ power division controller PSCk, a $k^{th}$ section with differential group delay, termed $k^{th}$ DGD section DGDSk below, and a $k^{th}$ differential phase shifter PSk. The $k^{th}$ power division controller PSCk and $k^{th}$ differential phase shifter PSk can also have differential group delays such that they are part of the $k^{th}$ DGD section DGDSk in an alternative design variant.

Figure 3:
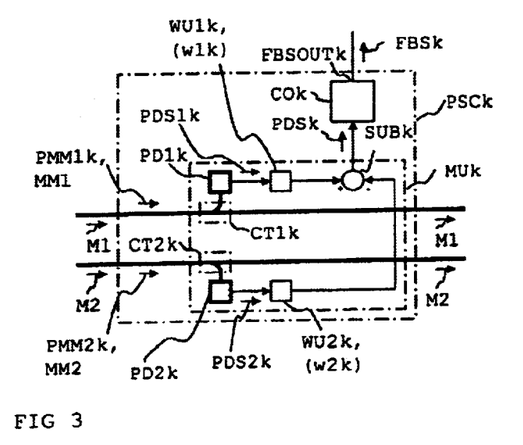
FIG. 3 is a diagrammatic view of a power division controller with measuring unit.

FIG. 3 shows the design of the $k^{th}$ power division controller PSCk, which is traversed by first and second signal modes M1, M2. It includes a $k^{th}$ measuring device MUk wherein the power of at least a first measurement mode MM1, preferably however of a first and a second measurement mode MM1 and MM2, respectively, of the optical signal OS is measured. Here, first and second measurement modes MM1, MM2 are identical to or proportional to first and second signal modes M1, M2, respectively. First and second measurement modes MM1, MM2 have a first and second power PMM1k, PMM2k, respectively, of the $k^{th}$ measuring device MUk. First and second measurement modes MM1, MM2 and signal modes M1, M2 traverse a first and second branching coupler CT1k, CT2k, respectively, of the $k^{th}$ measuring device MUk, wherein in each case a small proportion of the first and second powers PMM1k, PMM2k of the measurement modes MM1 and MM2, respectively, are branched off and are fed to a first and second photodetector PD1k, PD2k, respectively, of the $k^{th}$ measuring device MUk which make available a first and second photodetection signal PDS1k, PDS2k of the $k^{th}$ measuring device MUk. At least in applications relating not only to the generation or compensation of first-order chromatic dispersion, but also, for example, to the generation or compensation of second-order and, if appropriate, higherorder and/or polarization mode dispersion, it is expedient for these first or second photodetection signals PDS1k, PDS2k of the $k^{th}$ measuring device to be weighted in a first and second weighting unit WU1k, WU2k each of the $k^{th}$ measuring device MUk with a first and second weighting factor w1k, w2k, respectively, of the $k^{th}$ measuring device MUk before they are fed to a $k^{th}$ subtractor SUBk at whose output there is available a $k^{th}$ power division signal PDSk proportional to a linear combination of the first and second power PMM1k, PMM2k of the $k^{th}$ measuring device MUk. Starting from the $k^{th}$ measuring unit MUk, that signal is fed to a $k^{th}$ controller COk that is preferably provided with an integral component. Available at its output, the $k^{th}$ controller output FBSOUTk, is a $k^{th}$ control signal FBSk that controls a $k^{th}$ control element CEk.

Figure 4:
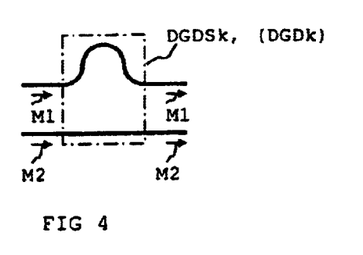
FIG. 4 is a diagrammatic view of a DGD section forming a part of the DGD unit.

FIG. 4 shows a possible design of the $k^{th}$ DGD section DGDSk. First signal mode M1 and second signal mode M2 are transmitted with different propagation times in order to generate the $k^{th}$ differential group delay DGDk, and this can be done by way of a detour.

Figure 5:
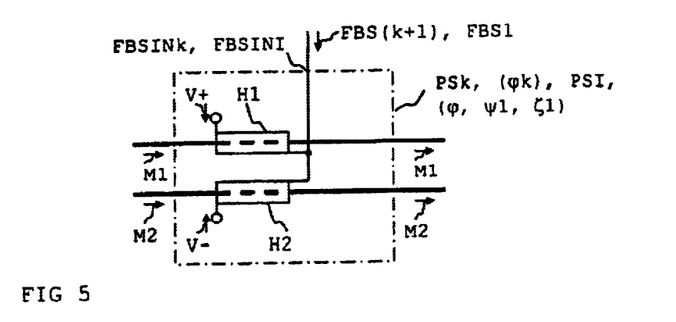
FIG. 5 is a diagrammatic view of a differential phase shifter.

FIG. 5 shows the design of a $k^{th}$ differential phase shifter PSk designed to be controllable. In a first exemplary embodiment of the invention, it is used as $(k+1)^{th}$ control element CE(k+1). It can generate a $k^{th}$ differential phase shift φk between first signal mode M1 and second signal mode M2. For this purpose, a first and second heating element H1, H2, respectively, are applied to the waveguides transmitting the first and second signal modes M1, M2. One end of one of these heating elements H1, H2 is respectively connected to a positive or negative voltage source V+, V−, respectively. The respective other end is connected to a $k^{th}$ control signal input FBSINk at which the $(k+1)^{th}$ control signal FBS(k+1) can be fed in, as may be seen from FIG. 1. For FBSk+1=V+ or FBSk+1=V−, the first or the second heating element H1, H2 is not heated at all, whereas the respective other one is heated maximally, such that a maximum $k^{th}$ differential phase shift φk of selectable sign occurs between the first signal mode M1 and second signal mode M2. The heating elements H1, H2 are heated equally strongly for FBS(k+1)=0, such that a vanishing $k^{th}$ differential phase shift φk occurs, assuming symmetrical design of the differential phase shifter PSk. All the possible intermediate values of the $k^{th}$ differential phase shift φk can likewise be set by varying the $(k+1)^{th}$ control signal FBS(k+1).

Figure 6:
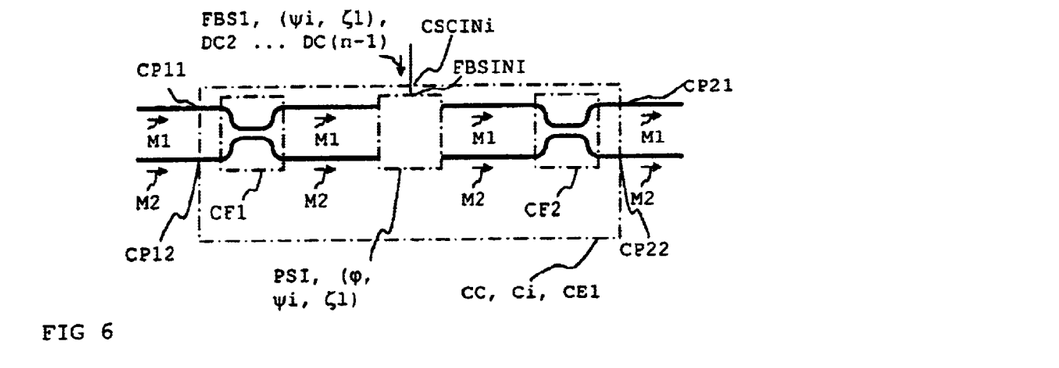
FIG. 6 is a diagrammatic view of a coupling unit.

FIG. 6 shows a controllable coupler CC being used as $i^{th}$ coupling unit Ci, it holding that i=1,2, . . . ,n, with a first and a second input gate CP11 and CP12, respectively, and a first and a second output gate CP21 and CP22, respectively, in each case for the first or second signal mode M1 or M2. First and second signal modes M1, M2 traverse therein two fixed couplers CF1, CF2, preferably designed as 1:1 couplers, and a further differential phase shifter PSI therebetween with a further differential phase shift φ. The latter phase shifter is designed by analogy with the $k^{th}$ differential phase shifter PSk. The $i^{th}$ coupling control input CSCINi of the $i^{th}$ coupling unit Ci, to which an $i^{th}$ dispersion control signal DCi can be fed, is connected in the controllable coupler CC constituting the $i^{th}$ coupling unit Ci to a further control input FBSINI, for the purpose of controlling a further differential phase shift φ between first and second signal modes M1, M2. By using the further differential phase shifter PSI it is possible, given the presence of an optical signal OS only at the first input gate CP11, for said signal to be capable of division with an arbitrary division ratio between the two output gates CP21, CP22, it also being possible for two different phase differences to occur between the signals leaning the output gates CP21, CP22, in the signal modes M1, M2 which differ from one another by π modulo 2π. The further differential phase shift φ in the ith coupling unit Ci therefore forms an $i^{th}$ coupler angle ψi.

Let the transfer matrix for transmitting the first and second signal modes M1, M2 of the fixed couplers CF1, CF2 be $$\frac{1}{\sqrt{2}}\begin{bmatrix} 1 & -j \\ -j & 1 \end{bmatrix}$$

for example, in each case, and let that of the further differential phase shifter PSI be $$\begin{bmatrix} e^{j\varphi/2} & 0 \\ 0 & e^{-j\varphi/2} \end{bmatrix}.$$

The expression $$\frac{1}{\sqrt{2}}\begin{bmatrix} 1 & -j \\ -j & 1 \end{bmatrix}\begin{bmatrix} e^{j\varphi/2} & 0 \\ 0 & e^{-j\varphi/2} \end{bmatrix}\frac{1}{\sqrt{2}}\begin{bmatrix} 1 & -j \\ -j & 1 \end{bmatrix} = -j\begin{bmatrix} -\sin(\varphi/2) & \cos(\varphi/2) \\ \cos(\varphi/2) & \sin(\varphi/2) \end{bmatrix}$$

is obtained as transfer matrix of the controllable coupler CC by matrix multiplication.

Setting φ=ψi yields the transfer matrix $$-j\begin{bmatrix} -\sin(\psi i/2) & \cos(\psi i/2) \\ \cos(\psi i/2) & \sin(\psi i/2) \end{bmatrix}$$

for the ith controllable coupler Ci. First and second signal modes M1, M2 are just exchanged by an $i^{th}$ coupler angle ψi with the value ψi=0. First and second signal modes M1, M2 are transmitted without variation except for a change by π in the relative phase angle by an $i^{th}$ coupler angle ψi with the value ψi=±π. A common phasor, which is caused physically by the signal propagation time, has been omitted here for the sake of simplicity. The first coupling unit C1 is used as first control element CE in the first exemplary embodiment of the invention.

Figure 7:
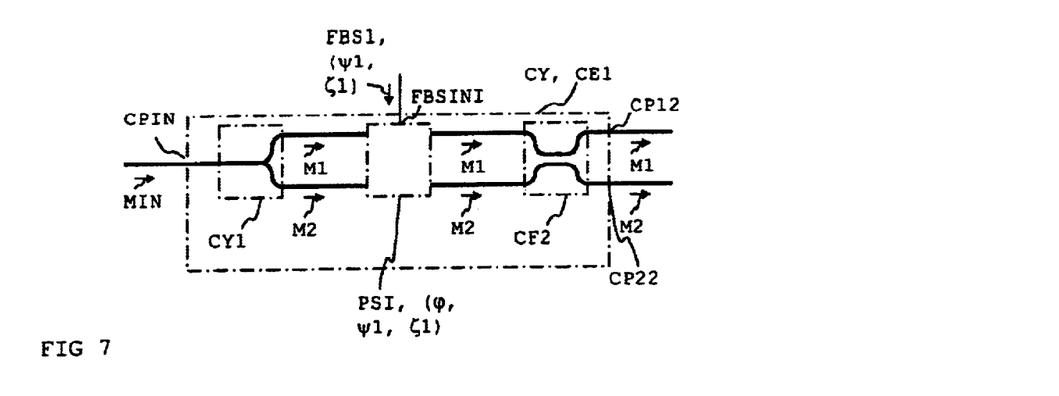
FIG. 7 is a diagrammatic view of a controllable splitter.

FIG. 7 shows a controllable coupler CY being used as first coupling unit C1. It is of largely identical design to the controllable coupler CC. One difference to the controllable coupler CC is that the first fixed coupler CF1 is replaced by a preferably symmetrically designed first Y-fork CY1 whose first and second outputs transmit first and second signal modes M1, M2, respectively, to the further differential phase shifter PSI. The input mode MIN of the optical signal OS is fed to one input CYIN of the first Y-fork CY1, which at the same time is the output CPIN of the controllable coupler CY and of the optical filter. Since a symmetrically designed first Y-fork CY1 causes a phase shift between its two output signals that differs by ±π/2 from that phase shift at the outputs of the first fixed coupler CF1 and results when an optical signal OS is fed in only at one of its inputs, the controllable coupler CY acts like a controllable coupler CC as first coupling unit C1 to which an optical signal OS is fed only at one of its inputs CP11, CP12, and wherein the first coupler angle ψi has been changed by ±π/2, the sign being yielded from the geometry.

Figure 8:
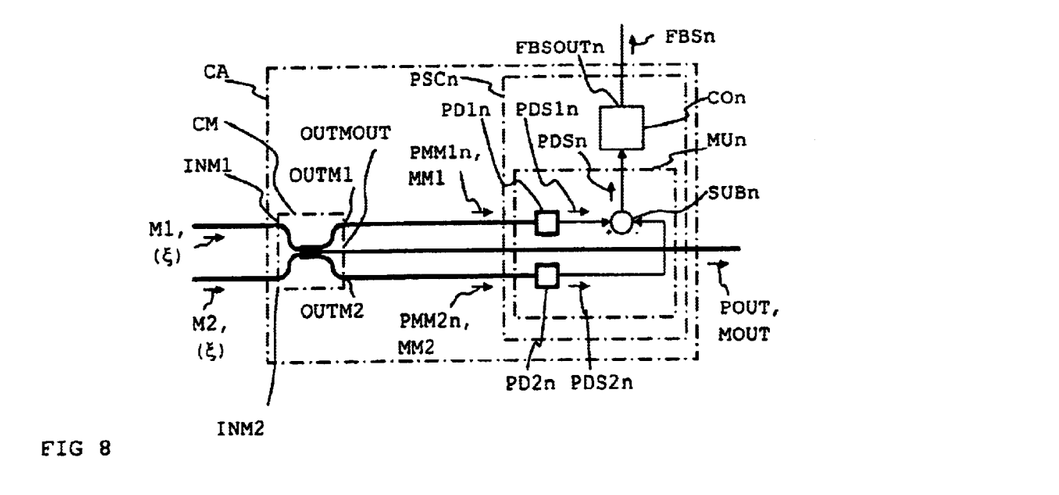
FIG. 8 is a diagrammatic view of a combiner/power division controller unit.

The $n^{th}$ coupling unit Cn can be implemented by a combiner/power division controller unit CA in accordance with FIG. 8. Said unit includes a multimode coupler CM and an $n^{th}$ power division controller PSCn. The first and second signal modes M1, M2 at a first and second signal mode input INM1, INM2 are led to the multimode coupler CM. Given equal amplitudes and phases of the first and second signal modes M1, M2, that is to say given a combiner input phase difference angle ξ between first and second signal modes M1, M2 at the signal mode inputs INM1, INM2 with the value ξ=0, the multimode coupler CM outputs on the output side first and second measurement modes MM1, MM2 with equally large first and second, preferably comparatively small first and second measured powers PMM1n, PMM2n of the nth measuring device MUn at a first and second measurement mode output OUTMM1, OUTMM2, and outputs the output mode MOUT with preferably relatively high power at a further output mode output OUTMOUT, that is preferably situated centrally between first and second measurement mode outputs OUTMM1, OUTMM2. The distance between the signal mode inputs INM1, INM2 is preferably selected to be smaller than the distance between the measurement mode outputs OUTMM1, OUTMM2. If first and second signal modes M1, M2 are equally strong at the signal mode inputs INM1, INM2, but have a combiner input phase difference angle ξ with the value ξ=π, the first and second measurement modes MM1, MM2 are likewise equally strong at the measurement mode outputs OUTMM1, OUTMM2, and the first and second measured powers PMM1n, PMM2n of the nth measuring device MUn are likewise equally high, while the power of the output mode MOUT is at least approximately equal to zero. If first and second signal modes M1, M2 are equally strong at the signal mode inputs INM1, INM2, but other combiner input phase difference angles ξ than 0 or π exist, first and second measurement modes MM1, MM2 at the measurement mode outputs OUTMM1, OUTMM2 are unequally strong, and therefore the first and second measured powers PMM1n, PMM2n of the $n^{th}$ measuring device MUn are unequally large.

In the $n^{th}$ measuring device MUn, first and second measurement modes MM1, MM2 are detected in a first and second photodetector PD1n, PD2n, respectively, of the nth measuring device MUn, which make available a first and second photodetection signal PDS1n, PDS2n of the $n^{th}$ measuring device MUn. These are fed to an nth subtractor SUBn, at whose output there is available an $n^{th}$ power division signal PDSn, proportional to the difference between the first and the second power PMM1n, PMM2n of the $n^{th}$ measuring device MUn, of the $n^{th}$ measuring device MUn. Starting from the $n^{th}$ measuring unit MUn, said signal is fed to an nth controller COn preferably provided with an integral component. An $n^{th}$ control signal FBSn is available at the output of said controller, the $n^{th}$ controller output FBSOUTn.

The optical filter OF1 according to the invention has a plurality of control circuits whose function is now explained. In order to be able to achieve stability and, at the same time, the desired optical filter properties, it is necessary to select correctly the sign of the controller gain of the $i^{th}$ controller COi. This is easy to accomplish in practice and is explained using an example. Let the optical signal OS in first and second signal modes M1, M2 be described by the input-side field strength vector EIN. Let the $i^{th}$ control element CEi be traversed by an $i^{th}$ controlled variable ξi that is represented by an $i^{th}$ transfer matrix CEiM(ξi), as always with i=1,2, ... ,n. Thereafter, let it traverse a further optical element FE with a further transfer matrix FEM, at whose outputs first and second measurement modes MM1, MM2 are available, and which is described by the output-side field strength vector $$EOUT = \begin{bmatrix} EOUT1 \\ EOUT2 \end{bmatrix} = FEM \cdot CEiM(\xi i) \cdot EIN.$$

A fraction f of the field strengths may be detected in the photodectors PD1i, PD2i of the $i^{th}$ measuring unit MUi. After weighting in the weighting units WU1i, WU2i of the ith measuring unit MUi and subtraction in the ith subtractor SUBi, the result is the $i^{th}$ power division signal PDSi= |f·EOUT1|²·w1i−|f·EOUT2|²·w2i. An $i^{th}$ controller COi can bring about vanishing only when there is an operating point ξ0 of the $i^{th}$ controlled variable ξi for which it holds that PDSi=0. Let the $i^{th}$ controlled variable ξi as a function of the $i^{th}$ power division signal PDSi be equal to ξi=gi·∫PDSi·dt for the $i^{th}$ controller, which is of integrating design, for example, in cooperation with the $i^{th}$ control element CEi. In this case, gi is $i^{th}$ control factor whose polarity is to be determined. If the inequality dPDSi/dξi>0 holds at the operating point ξ0 being sought, it is necessary to select gi<0. If dPDSi/dξ<0 at the operating point being sought, it is necessary to select gi>0. These statements also hold for an ith controller COi designed as a proportional controller if the $i^{th}$ controlled variable ξi is equal to ξi=gi·PDSi. Even if, strictly speaking, it is necessary in each case to consider the entire spectrum of the optical signal OS, in most cases it is sufficient for the above calculation to consider a monochromatic wave in conjunction with the center angular frequency ω of the optical filter.

The following holds when the first optical filter OF1 is configured as a first-order chromatic dispersion compensator in accordance with FIG. 1 with a controllable splitter CY when used as first coupling unit C1 and combiner/power division controller unit CA when used as $n^{th}$ coupling unit Cn:

The weighting units WU1i, WU2i of the $i^{th}$ measuring unit MUi with i=1,2, ... ,n can be eliminated such that the corresponding weights w1i, w1i are equal to 1.

For i=1, the first controlled variable ξ 1 is the first coupler angle ψ1. The input-side field strength vector EIN at the outputs of the first Y-fork CY1 is $$EIN = \frac{1}{\sqrt{2}}\begin{bmatrix} 1 \\ 1 \end{bmatrix}.$$

The first transfer matrix of the corresponding further differential phase shifter PSI is $$CEIM(\psi 1) = \begin{bmatrix} e^{j(\psi 1)/2} & 0 \\ 0 & e^{-j(\psi 1)/2} \end{bmatrix}.$$

The further optical element FE is the second fixed coupler CF2 of the controllable splitter CY with the further transfer matrix $$FEM = \frac{1}{\sqrt{2}}\begin{bmatrix} 1 & -j \\ -j & 1 \end{bmatrix};$$

the secondary diagonal elements can also have opposite signs, depending on geometry. The result is the first power division signal PDS1=|f|²·sin(ψ1). Possible operating points ξ0 are ξ0=ξ1=ξ1=ψ1=0 and ξ0=ξ1=ψ1=π. In the first-named case, a negative first control factor g1<0 is selected, and in the second-named case a positive first control factor g1>0, stability being produced thereby in each case. In the first-named case EAUS is proportional to $$\frac{1}{\sqrt{2}}\begin{bmatrix} 1 \\ 1 \end{bmatrix}$$

and in the second-named case is proportional to $$\frac{1}{\sqrt{2}}\begin{bmatrix} 1 \\ -1 \end{bmatrix}.$$

Here, the inventive control loop of the controllable splitter CY serves the purpose of achieving one of said output-side field strength vectors EAUS even when the first Y-fork CY1 is asymmetric.

For i=k+1 with k=1,2, . . . ,n−1, the (k+1)$^{th}$ controlled variable ξ(k+1) is the k$^{th}$ differential phase shift φk. As just determined for k=1 and is subsequently determined for k>1, neglecting a common phasor a field strength vector $$\frac{1}{\sqrt{2}}\begin{bmatrix} 1 \\ \pm 1 \end{bmatrix}$$

occurs at the input of the k$^{th}$ DGD unit DGDUk, that is to say at the output of the k$^{th}$ coupler element CUk, the sign being a function of the sign of the preceding first to kth controller gains gm with m=1,2, . . . ,k. The input-side field strength vector EIN occurs at the input of the k$^{th}$ differential phase shifter PSk after transfer through the k$^{th}$ DGD section DGDSk with the aid of the transfer matrix $$\begin{bmatrix} e^{j(\omega DGDk)/2} & 0 \\ 0 & e^{-j(\omega DGDk)/2} \end{bmatrix},$$

and is therefore equal to $$EIN = \frac{1}{\sqrt{2}}\begin{bmatrix} e^{j(\omega DGDk)/2} \\ \pm e^{-j(\omega DGDk)/2} \end{bmatrix}.$$

The transfer matrix of the corresponding k$^{th}$ differential phase shifter PSk is the (k+1)$^{th}$ transfer matrix CE(k+1)M (Ψk)=shifter PSk is the $$\begin{bmatrix} e^{j(\omega DGDk)/2} & 0 \\ 0 & e^{-j(\omega DGDk)/2} \end{bmatrix}.$$

For k=1,2, . . . ,n−2, that is to say i=2,3, . . . ,n−1, the further optical element FE is the i$^{th}$ controllable coupler Ci with i=k+1 and the transfer matrix $$FEM = -j\begin{bmatrix} -\sin(\psi i/2) & \cos(\psi i/2) \\ \cos(\psi i/2) & \sin(\psi i/2) \end{bmatrix};$$

other transfer matrices could also occur, depending on geometry. The result is the i$^{th}$ power division signal PDSi=−|f|$^2$·sin(ψi)·cos(φk+ω·DGDk). Possible operating points ξ0 are ξ0=ξ(k+1)=φk=π/2−ω·DGDk and ξ0=ξ(k+1)=φk=−π/2−ω·DGDk. In the first-named case, a negative i$^{th}$ control factor gi<0 is selected, and in the second-named case a positive i$^{th}$ control factor gi>0 is selected, stability being yielded in each case thereby. As required above, neglecting a common phasor an output-side field strength vector $$EAUS = \frac{1}{\sqrt{2}}\begin{bmatrix} 1 \\ \pm 1 \end{bmatrix}$$

then occurs at the output of the i$^{th}$, that is to say (k+1)$^{th}$, coupler element CUi, the proof by complete induction thereby being concluded. In the event of the i$^{th}$ coupler angle ψi exceeding an interval that is bounded by two neighboring integral multiples of π, the polarity of the i$^{th}$ control factor gi is preferably also changed. In order to prevent instabilities on the basis of nonideal component properties, it is possible in addition to lower the absolute value of the i$^{th}$ control factor gi at or as early as in the vicinity of these interval boundaries, or even to select it to be equal to zero.

Figure 9:
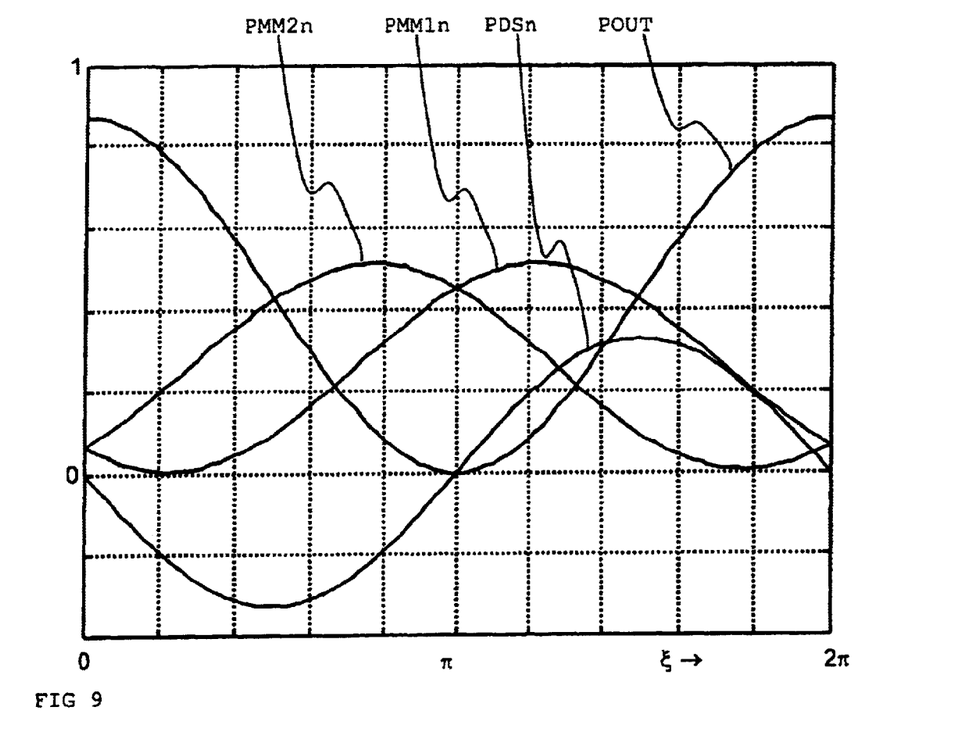
FIG. 9 is a graph plotting power profiles as a function of phase angle.

For k=n−1, that is to say i=n, the further optical element FE is the multimode coupler CM. When consideration is given to the two inputs for first and second signal modes M1, M2 and only to the two outputs for first and second measurement modes MM1, MM2, the transfer matrix $$FE = \begin{bmatrix} 0.2285 + j0.3947 & 0.0994 - j0.5485 \\ 0.0994 - j0.5485 & 0.2285 + j0.3947 \end{bmatrix}$$

for example, is obtained; other transfer matrices could also occur, depending on geometry. If, by contrast, consideration is given to only the output for the output mode MOUT, the result is a single-line output transfer matrix FEOUT= [0.6591 0.6591], which resembles that of a Y-combiner. For reasons of clarity, a common phasor that marks the signal propagation time has been removed in this case in the transfer matrix FE and output transfer matrix FEOUT. The resulting first and the second powers PMM1n, PMM2n of the n$^{th}$ measuring device MUn, the output power POUT of the optical filter OF1, and the nth power division signal PDSn and the filter output power POUT output into the output mode MOUT are illustrated in FIG. 9 as a function of the combiner input phase differential angle ξ=φ(n−1)+ ω·DGD(n−1)+κ, normalized to the maximum possible sum of the first and the second powers PMM1n, PMM2n of the nth measuring device MUn, and of the output power POUT of the optical filter OF1. In this case, the controlled variable ξ is equal to (n−1)$^{th}$ differential phase shift φ(n−1). The angular offset κ is κ=0 if the field strength vector at the input of the (n−1)$^{th}$ DGD unit DGDU(n−1) is proportional to $$\frac{1}{\sqrt{2}}\begin{bmatrix} 1 \\ 1 \end{bmatrix},$$

and κ=π if it is proportional to $$\frac{1}{\sqrt{2}}\begin{bmatrix} 1 \\ -1 \end{bmatrix}.$$

The described operating point ξ0 at which the filter output power POUT is also a maximum is ξ0=ξn=φ(n−1)=−ω·DGD (n−1)−κ, while ξ0=ξn=φ(n−1)=πω·DGD(n−1)−κ is eliminated, since the filter output power POUT vanishes there. Since it holds at the desired operating point ξ0 that dPDSn/dξn<0, the n$^{th}$ control factor gn is to be selected to correspond to gn>0.

The n inventive control loops preconfigure the optical filter OF1 optimally for the compensation of first-order chromatic dispersion. The chromatic dispersion itself can be set by means of a second to (n−1) dispersion compensation signal DC2 . . . DC(n−1), which is fed to the second to (n−1)$^{th}$ coupling control input CSCIN2 . . . CSCIN(n−1), and controls the second to (n−1)$^{th}$ coupler phase angle $\psi 2 \ldots \psi(n-1)$ of the second to (n−1)$^{th}$ coupling unit C2 . . . C(n−1). Advantageous strategies for setting the chromatic dispersion without simultaneously generating undesired distortions are, for example, as follows: assuming identical design of the first to (n−1)$^{th}$ DGD unit DGDU1 . . . DGDUk, of the second to (n−1)$^{th}$ coupling elements C2 . . . C(n−1), the second to (n−1)$^{th}$ coupler phase angle $\psi 2 \ldots \psi(n-1)$ are preferably set such that they have alternating signs when normalized to the main interval $-\pi \ldots \pi$. The sign of a specific, for example :the second coupler phase angle $\psi 2$ determines the polarity of the first-order chromatic dispersion generated. If the first to (n−1)$^{th}$ differential group delays DGD1 . . . DGD(n−1) are excepted from the requirement of equality, it is frequently advantageous to equalize the n$^{th}$ and (n+1−m)$^{th}$ differential group delay DGDm, DGD(n+1−m) with m=2,3, . . . ,(n−1). Again, it is mostly advantageous to select pth differential group delays DGDp rising monotonically, but not necessarily strictly monotonically, for p=1,2, . . . ,pL, pL being that whole number that is either (n−1)/2 or n/2. The same holds for p=(n−1),(n−2), . . . ,pU, pU being that whole number that is either equal to (n−1)/2 or equal to n/2. In this way, the absolute values of the differential group delays DGDk in the middle of the optical filter OF1 are always at least equal in terms of absolute value to those in the vicinity of the first coupling element C1 or the nth coupling element Cn.

Moreover, it is frequently advantageous to equalize the mth and the (n+1−m)$^{th}$ coupler phase angles $\psi m, \psi(n+1-m)$ with m =2,3, . . . ,(n−1) in terms of absolute value.

Likewise, if they are not all equal to zero it is frequently advantageous to permit the p$^{th}$ coupler phase angles $\psi p$ to rise strictly monotonically for p=1, 2, . . . ,pL, pL being that whole number that is either (n−1)/2 or n/2. The same holds for p=(n−1),(n−2), . . . ,pU, pU being that whole number that is either equal to (n−1)/2 or equal to n/2. In this way, the absolute values of the coupler phase angles in the middle of the optical filter OF1 are always at least just as large in terms of absolute value as those in the vicinity of the first coupling element C1 or the n$^{th}$ coupling element Cn.

The previous description of the invention referred at least to a second to (n−1)$^{th}$ coupling element C2 . . . C(n−1), which was wherein by a transfer matrix $$-j \begin{bmatrix} -\sin(\psi i/2) & \cos(\psi i/2) \\ \cos(\psi i/2) & \sin(\psi i/2) \end{bmatrix}$$

with i=1, 2, . . . , n. If first and second fixed couplers CF1, CF2 in each case have a transfer matrix of the form $$\frac{1}{\sqrt{2}} \begin{bmatrix} 1 & j \\ j & 1 \end{bmatrix}$$

instead of the above-specified one of $$\frac{1}{\sqrt{2}} \begin{bmatrix} 1 & -j \\ -j & 1 \end{bmatrix},$$

transfer matrix of the second to (n−1)$^{th}$ coupling element C2 . . . C(n−1) respectively takes the form of $$j \begin{bmatrix} \sin(\psi i/2) & \cos(\psi i/2) \\ \cos(\psi i/2) & -\sin(\psi i/2) \end{bmatrix},$$

and so the sign of the first-order chromatic dispersion generated changes by comparison with the previous case.

If the first fixed coupler CF1 has the transfer matrix $$\frac{1}{\sqrt{2}} \begin{bmatrix} 1 & -j \\ -j & 1 \end{bmatrix}$$

whereas the second fixed coupler CF2 has the form of $$\frac{1}{\sqrt{2}} \begin{bmatrix} 1 & j \\ j & 1 \end{bmatrix},$$

a transfer matrix $$\begin{bmatrix} \cos(\psi i/2) & -j\sin(\psi i/2) \\ -j\sin(\psi i/2) & \cos(\psi i/2) \end{bmatrix}$$

results for the second to (n−1)$^{th}$ coupling elements C2 . . . C(n−1). This is to be taken into account correspondingly when generating and compensating chromatic dispersion. By comparison with the above-named cases, this means that the second to (n−1)$^{th}$ coupler phase angles $\psi 2 \ldots \psi(n-1)$, in particular, are preferably to be set such that they have the same sign when normalized to the main interval $-\pi \ldots \pi$, and that first to (n−1)$^{th}$ differential group delays DGD1 . . . DGD(n−1) have alternating signs. The above-specified advantageous ordinal relationships of the first to (n−1)$^{th}$ differential group delays DGD1 . . . DGD(n−1) are then replaced by corresponding ones with reference to their absolute values.

A transfer matrix of $$\begin{bmatrix} \cos(-\psi i/2) & -j\sin(-\psi i/2) \\ -j\sin(-\psi i/2) & \cos(-\psi i/2) \end{bmatrix}$$

results for the second to (n−1)$^{th}$ coupling elements C2 . . . C(n−1) when the first fixed coupler CF1 has the transfer matrix $$\frac{1}{\sqrt{2}} \begin{bmatrix} 1 & j \\ j & 1 \end{bmatrix},$$

whereas the second fixed coupler CF2 has the form of $$\frac{1}{\sqrt{2}} \begin{bmatrix} 1 & -j \\ -j & 1 \end{bmatrix}.$$

With reference to the last-named case, this means that the sign of the corresponding coupler phase angles $\psi 2 \ldots \psi(n-1)$ is inverted, and this is to be taken into account accordingly.

We claim:

1. An optical filter for an optical signal, comprising:
   a number n coupling elements and n−1 units with a differential group delay disposed in a conductor structure to be alternately traversed by the optical signal, wherein the optical signal can be divided between a first said coupling element and an n$^{th}$ said coupling element into a first signal mode and a second signal mode;

a measuring device disposed in a beam path of the optical signal, said measuring device outputting a power division signal characterizing a division of a power of the optical signal into a first measurement mode and a second measurement mode;

a control element disposed in the beam path of the optical signal upstream of said measuring device, said control element influencing the division of the power of the optical signal into the first and second measurement modes, and said control element having a control input connected to receive a control signal obtained from the power division signal such that a prescribed division of the power of the optical signal into the first and second measurement modes results.

2. The optical filter according to claim 1, wherein said control element is a controllable differential phase shifter, and one of said coupling elements, providing the first and second measurement mode, is connected between said differential phase shifter and said measuring device.

3. The optical filter according to claim 2, wherein said first and second measurement modes are first and second signal modes.

4. The optical filter according to claim 1, wherein said control element is formed by one of said coupling elements configured to be controllable.

5. The optical filter according to claim 4, wherein said first and second measurement modes are first and second signal modes.

6. The optical filter according to claim 2, wherein said coupling element has first and second measurement mode outputs carrying said first and second measurement modes, and an output mode output, between said first and second measurement mode outputs, carrying an output mode of the optical signal.

7. The optical filter according to claim 1, wherein said measuring unit includes devices for forming the power division signal proportionally to a linear combination of the powers of the first and second measurement modes.

8. The optical filter according to claim 7, wherein said measurement unit includes devices for forming the power division signal proportionally to a difference between the powers of the first and second measurement modes.

9. The optical filter according to claim 1, wherein one of said coupling units has a coupling control input connected to receive a dispersion compensation signal for controlling a coupler phase angle thereof.

10. A method for optical filtering, which comprises:

traversing with an optical signal n coupling elements and n−1 units having a differential group delay alternately in a conductor structure, and dividing the optical signal between a first coupling element and an $n^{th}$ coupling element into a first signal mode and a second signal mode;

generating a power division signal characterizing a division of a power of the optical signal into a first and second measurement mode;

generating a control signal and controlling with the control signal a control element influencing the division of the power of the optical signal into the first and second measurement modes, and thereby generating the control signal from the power division signal such that a prescribed division of the power of the optical signal into the first and second measurement modes results.

11. The method according to claim 10, which comprises generating a differential phase shift in the control element, and providing the first and second measurement modes by a coupling element between the control element and the measuring device.

12. The method according to claim 10, wherein the control element is a controllable coupling element.

13. The method according to claim 11, wherein first and second measurement modes are first and second signal modes.

14. The method according to claim 11, which comprises respectively outputting the first and second measurement modes at a first and second measurement mode output of the coupling element, and providing an output mode of the optical signal at an output mode output between the first and second measurement mode outputs.

15. The method according to claim 10, which comprises forming the power division signal proportionally to a linear combination of the powers of the measurement modes.

16. The method according to claim 15, which comprises forming the power division signal proportionally to a difference between the powers of the measurement modes.

17. The method according to claim 10, which comprises feeding a dispersion compensation signal for controlling a coupler phase angle to the coupling element.

* * * * *